US008624731B2

(12) United States Patent
Dearborn et al.

(10) Patent No.: US 8,624,731 B2
(45) Date of Patent: Jan. 7, 2014

(54) INFORMATION HANDLING SYSTEM STATUS ALERT SYSTEM

(75) Inventors: Timothy Charles Dearborn, Saugatuck, MI (US); Paul Doczy, Austin, TX (US); Kurt M. H. Heggland, Austin, TX (US); Theodore B. Pasquale, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 471 days.

(21) Appl. No.: 12/768,285

(22) Filed: Apr. 27, 2010

(65) Prior Publication Data

US 2011/0260864 A1    Oct. 27, 2011

(51) Int. Cl.
*G08B 21/00*    (2006.01)

(52) U.S. Cl.
USPC ..... 340/540; 340/517; 340/573.1; 340/691.1; 340/693.5; 340/5.1

(58) Field of Classification Search
None
See application file for complete search history.

(56) References Cited

U.S. PATENT DOCUMENTS

| 3,939,579 | A  | * | 2/1976  | Andrews et al. | 434/316 |
| 5,344,326 | A  | * | 9/1994  | Ferris | 434/336 |
| 6,888,322 | B2 | * | 5/2005  | Dowling et al. | 315/292 |
| 7,466,306 | B2 | * | 12/2008 | Connor et al. | 345/169 |
| 7,861,257 | B2 | * | 12/2010 | Park et al. | 725/28 |
| 8,090,852 | B2 | * | 1/2012  | Ianchici et al. | 709/229 |
| 2006/0147891 | A1 | * | 7/2006 | Dreyfous et al. | 434/362 |
| 2008/0094350 | A1 | * | 4/2008 | Pickover | 345/156 |
| 2008/0280279 | A1 | * | 11/2008 | Jang et al. | 434/308 |
| 2009/0315715 | A1 | * | 12/2009 | Larsen | 340/568.1 |

FOREIGN PATENT DOCUMENTS

JP    2006-065208    * 3/2006

OTHER PUBLICATIONS

Dell XPS LightFX, XPS LightFX™—Let There Be Light, p. 1, http://www.dell.com/html/global/xps/lightfx/index.html.
Welcome to Desktop Alert: Mass Notification Since 1995! Desktop Alert: Mass Notification Software Made Easy,2009, pp. 1-3, Desktop Alert, Inc. http://www.desktopalert.net/.
What Is Desktop Alert?, Desktop Alert Software v.4.0: An Instant Notification System, What is Desktop Alert?, 2005, pp. 1-2, E-shop Enterprises, http://www.desktopalertsoftware.com/desktop_alert.html.

* cited by examiner

*Primary Examiner* — Mohammad Ghayour
*Assistant Examiner* — Brian Wilson
(74) *Attorney, Agent, or Firm* — Haynes and Boone, LLP

(57) ABSTRACT

An information handling system status alert system includes an information handling system (IHS). The IHS includes a frame, a processor supported by the frame and a memory module communicatively coupled to the processor. The IHS additionally includes an operational display device coupled with the frame such that the operational display device is viewable from a first side of the frame. Furthermore, the IHS includes a status alert display device coupled with the frame such that the status alert display device is viewable from a second side of the frame, wherein the second side of the frame is substantially opposite the first side of the frame.

20 Claims, 5 Drawing Sheets

INFORMATION HANDLING SYSTEM STATUS ALERT SYSTEM

BACKGROUND

The present disclosure relates generally to information handling systems (IHSs), and more particularly to an IHS status alert system.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS provides an abundance of sounds, graphics, and other information/data to users of the IHS via output devices such as speakers and a display screen. In a group setting, such as a classroom, where the students are facing the teacher and the teacher is facing the students, the teacher cannot see what images or messages are being displayed on each individual student's IHS display because the teacher is generally positioned at the front of the class room and thus, at the back side of the display screen of each student's IHS. As such, it is difficult for the teacher or other non-user of the IHSs to quickly determine a status of each student's IHS or running applications in such a group setting. In other words, teachers have a difficult time monitoring an entire classroom of students using portable IHSs at the same time.

Unfortunately, it is difficult for the teacher to move away from their teaching position at the front of the class room and position themselves behind all of the students to monitor progress or status of the student's work on the IHS. As an example, if the students are all taking an exam on their individual IHS and one student is having difficulty with one question and stops progressing with the remaining exam questions, the teacher would not learn of this until the exam is over and turned in to the teacher and the student has earned a poor score on the exam. In this case, the student may fall behind. However, if the teacher could quickly scan the class room to see a status of each student's IHS or application, the teacher could address any problems or issues right from the start.

Some IHSs use custom alert systems. However, these alerts are delivered to the IHS display screen and the teacher or other non-user of the IHS would not be alerted because of their location at the front of the classroom. In addition, this type of alert system where the alert notification is provided to the display screen requires that the IHS be turned on and fully booted/operating. In addition, the user has to open run that particular application in order to receive the alert notification. In other examples, IHSs may provide peripheral based alerts, but these alerts generally include using a light or other device in a fixed function manner.

Accordingly, it would be desirable to provide an improved IHS status alert system.

SUMMARY

According to one embodiment, an information handling system status alert system includes an information handling system (IHS). The IHS includes a frame, a processor supported by the frame and a memory module communicatively coupled to the processor. The IHS additionally includes an operational display device coupled with the frame such that the operational display device is viewable from a first side of the frame. Furthermore, the IHS includes a status alert display device coupled with the frame such that the status alert display device is viewable from a second side of the frame, wherein the second side of the frame is substantially opposite the first side of the frame.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
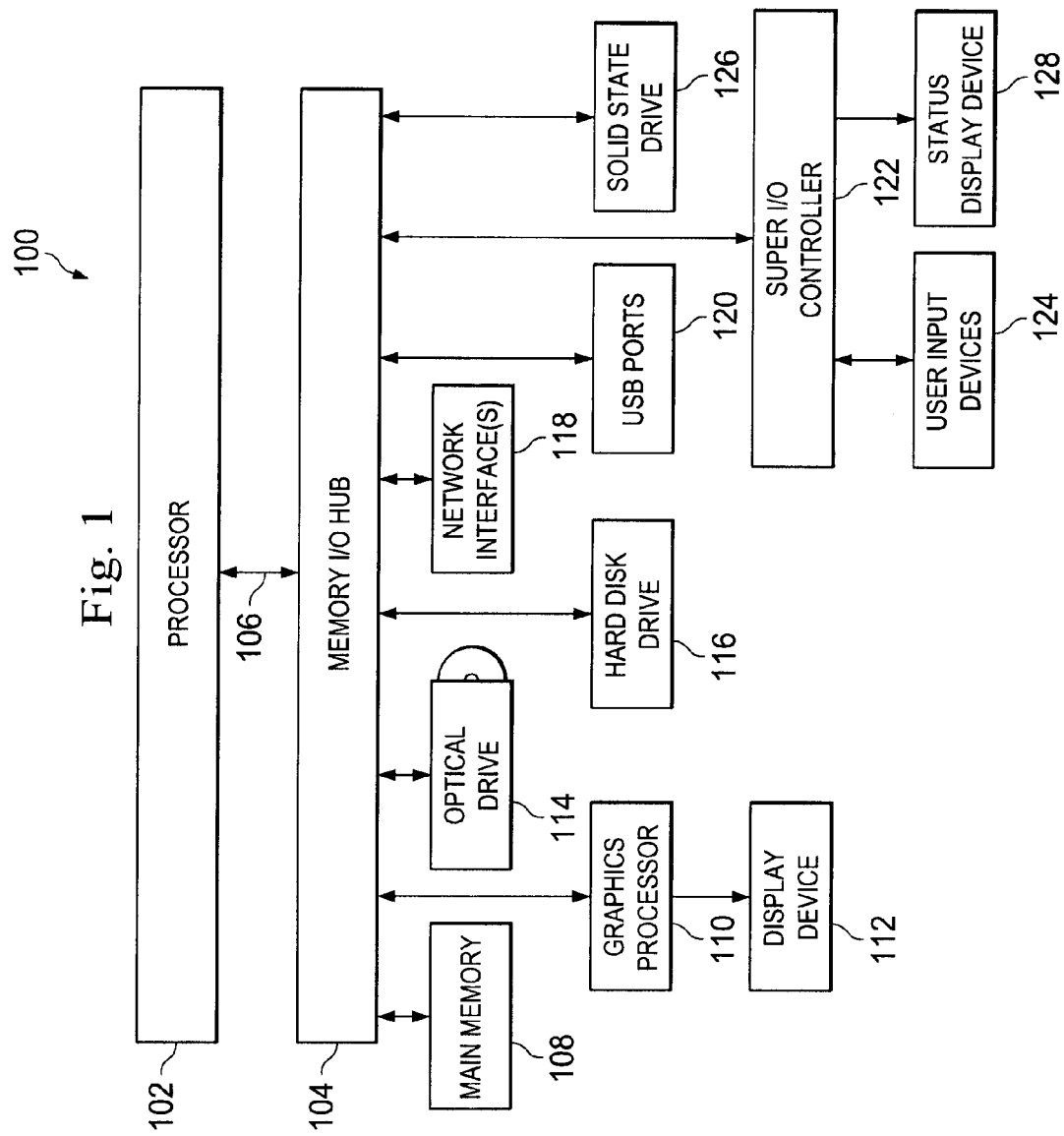
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

The IHS 100 also includes an IHS status display device 128. In an embodiment, the status display device 128 is set of different colored light emitting diodes (LEDs) that can be controlled using software to illuminate at different colors and at different on/off blinking sequences to indicated alert messages or that the IHS 100 is in a certain operating mode. In another embodiment, the status display device 128 is a liquid crystal display (LCD) device that can be controlled using software to display different textual or character messages to indicate that the IHS 100 is in different operating modes. It should be understood that the status display device 128 may include LEDs, LCDs and/or a variety of other display devices for indicating different operating modes of the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
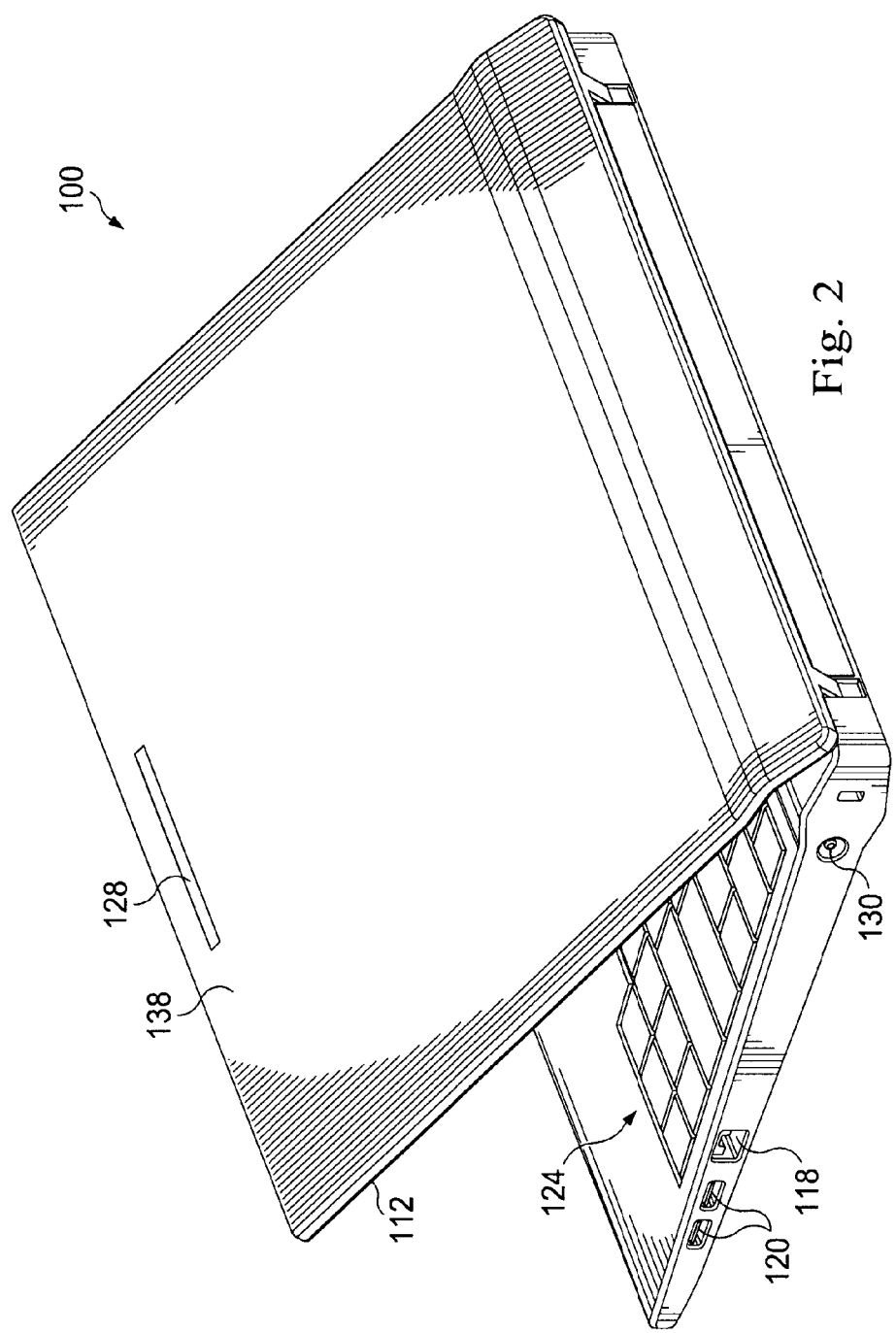
FIG. 2 illustrates a portable embodiment of the IHS of FIG. 1.

FIG. 2 illustrates a portable embodiment of the IHS 100. As shown, this embodiment of the IHS 100 is configured as a clam shell frame type portable IHS. As such, the IHS 100 includes a base 136 portion and a lid 138 portion. However, other types of IHS may be used with the present disclosure. Additionally, the IHS 100 includes a display device 112 located on an inner or user's side of the lid 138. In an embodiment, the display device 112 is a color LCD display screen. However, other types of display device may be used with the IHS 100 of the present disclosure. The IHS 100 also includes a network interface 118 plug receptacle, and USB ports 120, user input devices 124 (e.g., keyboard, mouse pointer, touchpad, etc.).

In addition, the IHS 100 includes a status display device 128 and a power supply input receptacle 130. In an embodiment, the status display device 128 is integrated into the outer side of the lid 138 portion of the IHS 100. As such, a user of the IHS 100 can operate the IHS using the user input devices 124 and viewing the display device 112. On the other hand, when a user (e.g., a student in a classroom) is using the IHS 100, a non-user (e.g., a teacher in the classroom) can view the status display device 128. In this way, a teacher may see the status of a room full of IHSs with a quick glance from the front of the class room.

As should be understood, the status display device 128 may be used by non-users of the IHS 100. When the IHS 100 clam shell frame is closed, the status display device 128 may be visible above and on sides of the IHS 100. When the IHS 100 is being used and the lid 138 is open, the user of the IHS 100 may not be able to view the status display device 128. However, non-users behind the IHS should be able to easily view the status display device 128. In use, the status display device 128 may be configured to indicate an operation status of the IHS 100 to those who are not directly using the IHS 100, but may need to know what actions or activities are taking place on the IHS 100. Thus, the non-user (e.g., a classroom teacher, etc.) may learn about the status of the user of that IHS.

In an embodiment, the systems of the present disclosure provide an ability to allow software application developers to take control of this status display device 128 (e.g., a set of colored LEDs) using software application programming interface (API) or other programming tools to provide customizable alerts to be displayed using the status display device 128 per the requirements of their software application. In other words, it is to be understood that use of the status display device 128 may be used for and controlled by $3^{rd}$ party non-users of the IHS 100. For instance, in a classroom setting, a teacher may use a communicative system software application to put all of the student's IHSs in the classroom into a test taking mode that causes the status display device 128 to be on showing a solid green color when the IHS is in a test taking mode. Additionally, the status display device 128 may blink yellow when the student has a question, blink red when a student gets a question wrong, and blink green when the test is completed. In another application the status display device may flash or otherwise cycle through illumination sequences and/or change colors, and/or display a textual message, thereby, showing progress on a class assignment, and etc. This type of software application may be loaded standard on the IHS 100 or may be implemented by an IHS information technology (IT) administrator at a school, workplace, hospital, military institution, or any other group location. In an embodiment, the status display device 128 may be controlled using a device control protocol (DCP) or other system.

In short, the present disclosure provides a system for creating custom alerts on the IHS 100, which may be quickly viewed by teachers, parents, IT administrators, students and/or others, such as non-users of the IHS 100 in different settings, such as group settings. Thus, embodiments of the present disclosure provide for the creation of different alerts or sets of alerts using the status display device 128 on portable IHSs 100 in an educational or other environment. In the educational setting, the alerts may be fully customized based on the needs of the school district, school or individual classroom. In other settings, alerts may be customized to function in a 1 to 1 deployment setting.

It should be understood that embodiments of the present disclosure provided herein include a colored LED window on the back of the IHS 100 that can be changed by color or blink rate to indicate various states, behaviors, or alerts for the IHS 100. However, other indicator may be used. In a classroom setting types of alerts may include, but are not limited to, student is operating in the prescribed network or application, the student is ahead or behind in a lesson, there is a problem with the IHS 100 that is preventing the student from continuing, the student has a question for the teacher. Outside of the class room indicators may relate to, but are not limited to notices that the IHS 100 has been stolen, the parent of the student must attend to something, there is a message for the parent/student from the school/principle/teacher, and/or any variety of alert messages as desired.

Figure 3:
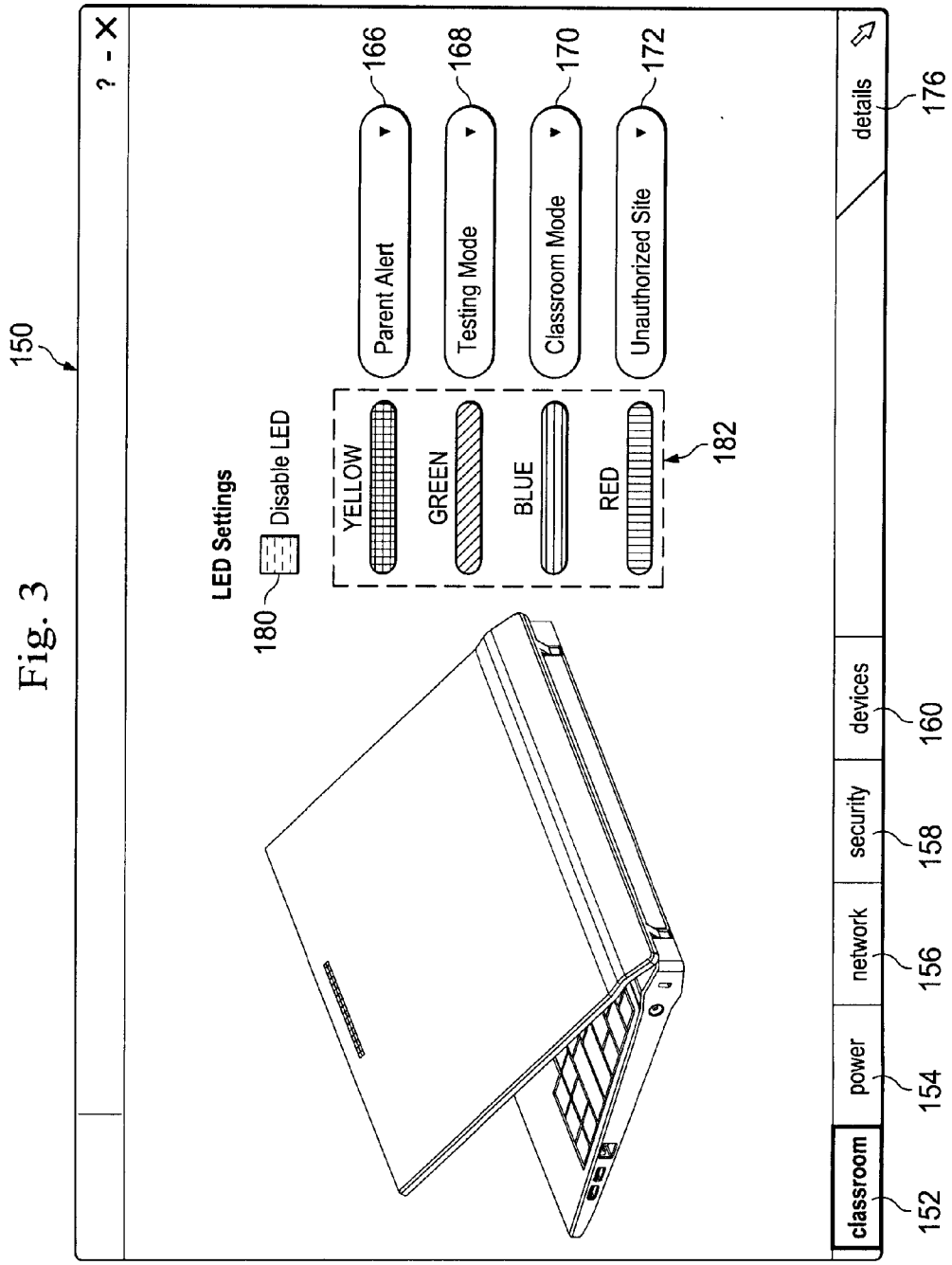
FIG. 3 illustrates a screenshot of an embodiment of an administrator setup screen for setting-up use of a status display device, according to the IHS of FIG. 2.
Figure 4:
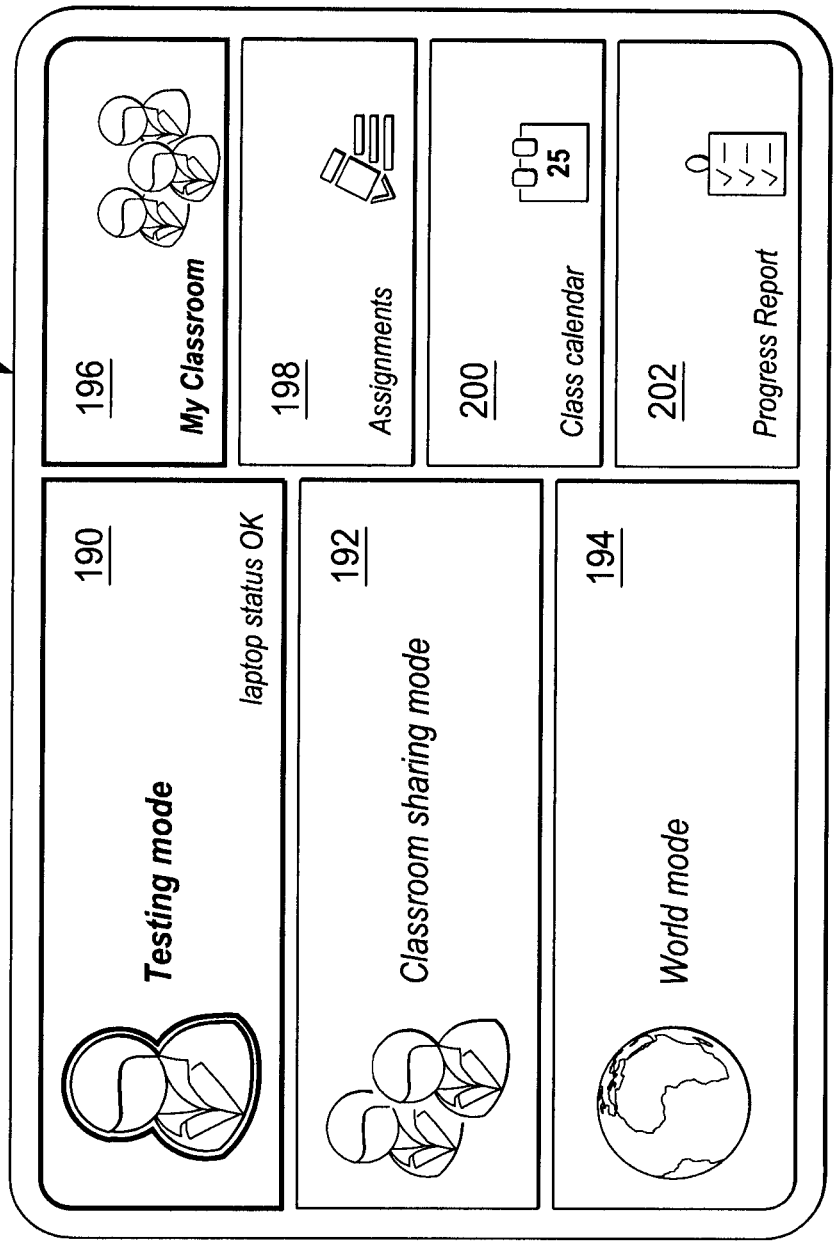
FIG. 4 illustrates a screenshot of an embodiment of a teacher IHS status control setup screen.
Figure 5:
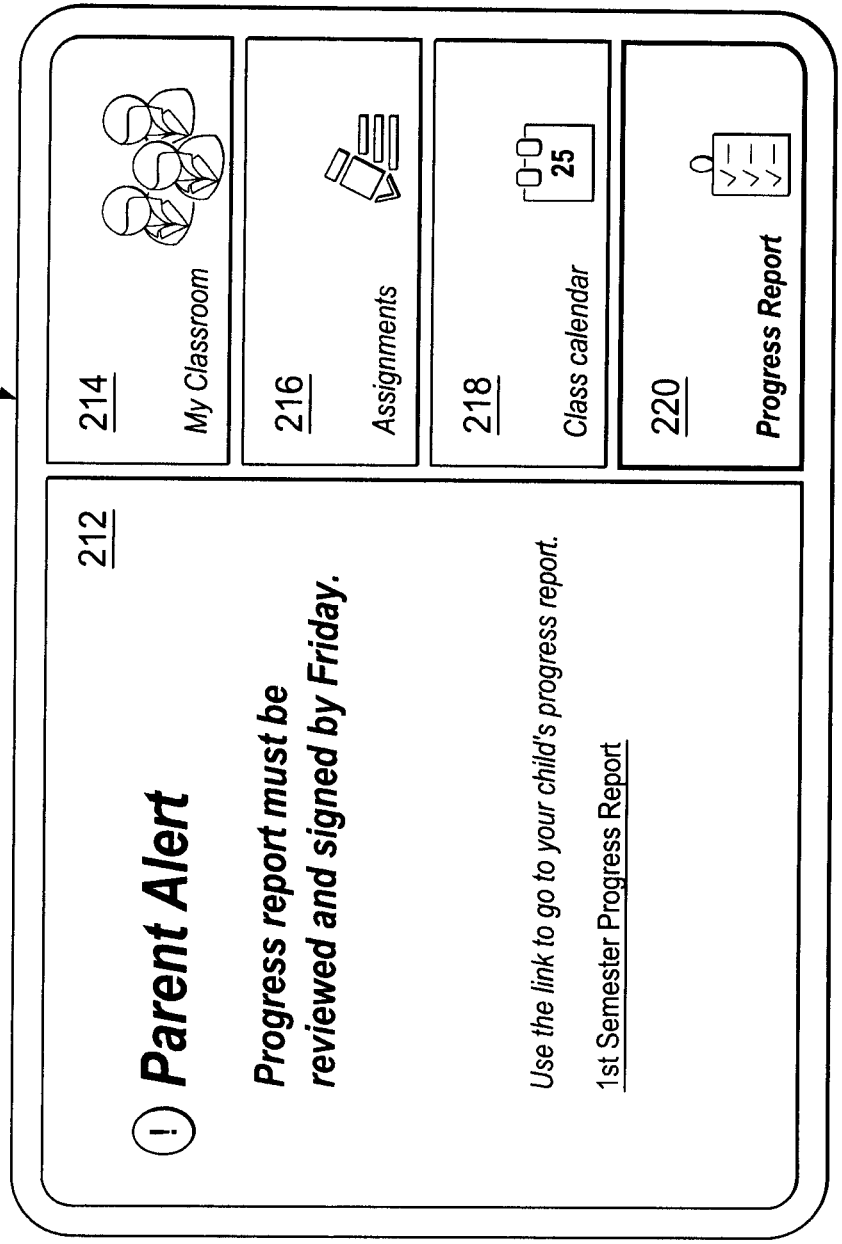
FIG. 5 illustrates a screenshot of an embodiment of a parent alert screen.

Another feature of the present disclosure is a system and method to control and customize the alert system to the needs of the particular school environment. This may be performed using a customizing software control panel that allows for the creation, storage, and deployment of alerts to a single IHS status display device 128 or to multiple IHS's status display devices (e.g., 128). FIGS. 3-5 provide screen shots for an embodiment of such a software control panel.

FIG. 3 illustrates a screenshot of an embodiment of an administrator setup screen 150 for setting-up use of status display device 128. The design, functionality, and operation of the setup screen 150 may vary according to different uses and are shown here only for explanation of the concept. As shown, this embodiment of the setup screen 150 includes tabs along a lower tool bar that allows the user to choose categories in which to work. For example, this setup screen 150 includes tabs to toggle the user to different working environments such as classroom management tab 152, power management tab 154, communication network management tab 156, security management tab 158 and/or device management tab 160. As should be understood, the options and functionality of each tab may vary for different environments (e.g., different schools) and for different industries (e.g., corporate, medical, etc.).

As shown, the classroom tab 152 is highlighted and thus, chosen to be the working screen. This screen allows the user to choose between different classroom/teaching services for using the status display device 128, as shown, the setup screen 150, includes menus for the administrator/teacher to choose. For example, the administrator may choose the parent alert menu 166, the testing mode menu 168, the classroom mode menu 170 and/or the unauthorized side menu 172. In addition, the administrator may choose to enable or disable the status display device 128 using the status display enable/disable button 180. The definition of the function of the status display device 128 may be indicated by the status display device definition indicators 182 on the administrator setup screen 150. In the embodiment shown, the parent alert tab 166 pulls up a parent alert editor screen that allows the administrator to draft a letter to a parent of a student who uses a particular IHS or to the entire group/class (see for example, FIG. 5). Then, once the administrator saves the parent alert, the system allows the administrator to turn the status display device 128 to a color (e.g., yellow) until the parent reads the alert and acknowledges it. The status display device 128 may also be configured to flash in one or more sequences, which may indicate different messages or different states. The testing mode menu 168 may allow the administrator to put all IHSs 100 in the classroom into a testing mode where certain communication and file operations may be restricted.

As shown, putting the user IHSs 100 into a testing mode may turn the status display device 128 green so that the administrator can easily look around the classroom and see that all IHSs 100 are in the proper testing mode. The classroom mode menu 170 may allow the administrator to set all the IHSs 100 in the room to a classroom working mode. This, in turn, may define one or more operating modes, such as communications, file access, Internet access, and any variety of operating modes. When in this mode the status display device 128 may be turned to blue. Similarly, the unauthorized site menu 172 may allow the administrator to define authorized and unauthorized Internet sites and may turn the status display device 128 to flashing red. Viewing this, the administrator may decide to turn off Internet access for the user viewing the unauthorized site. As should be understood any type and number of applications and functions in the administrator software may allow for any type of operation and definition for the status display device 128. Other tabs, such as the details tab 176 may be used to provide different functions or to provide information such as software name and revision or any variety of information. In other words, other tabs, menus, and the like may be used and it is to be understood that the options and functionality of each menu may vary for different environments (e.g., different schools) and for different industries (e.g., corporate, medical, etc.).

FIG. 4 illustrates a screenshot of an embodiment of a teacher IHS status control setup screen 188. This setup screen 188 is shown to provide an example of a setup screen that allows an administrator/teacher to set teaching or operating modes or states of the IHSs 100 in the classroom. For example, the administrator may modify functionality using the testing mode field 190, the classroom sharing mode field 192, the world mode field 194, or any variety of fields to modify operating modes or functionality of the IHSs 100. In addition, the setup screen 188 may allow the administrator to perform other work tasks. These may be accessed using fields such as the administrator my classroom field 196, the administrator assignments field 198, the administrator class calendar field 200, the administrator progress report field 202, and/or other fields.

FIG. 5 illustrates a screenshot of an embodiment of the parent alert screen 210. The parent alert screen 210 or some other screen may be accessed and viewed on the user/student IHS 100. Referring also back to FIG. 3, if the administrator drafts a parent alert, note the status display device 128 on the user IHS 100 will illuminate yellow. This indicates to the parent of the user that there is a message. The parent may then access this screen 210 on the user IHS 100 to view the message. The message may be viewed in the message field 212. Additionally, the message field may include one or more links (e.g., $1^{st}$ Semester Progress Report link) and may provide for the parent acknowledging having read the alert message. The parent may acknowledge by using a password, electronic signature, or by some other method. In addition, the user and the parent may access the users fields, such as the user my classroom field 214, the user assignments field 216, the user class calendar field 218, the user progress report field, and/or other fields.

As should be understood, this software and systems of the present disclosure may provide any use or functionality that may benefit by having a programmable status display device 128. In embodiments, the systems and software of the present disclosure provide for multiple colors & blink rates of the status display device 128. The present disclosure may be configured as an open architecture tool for customization. Software to configure the status display device 128 may include a software user interface for defining additional functionality of the status display device and operation modes of the IHS 100. In an embodiment, the status display device may be configured to provide to the administrator an indication of unauthorized programs usage, virus detection/IHS support needed, parental alerts, theft of the IHS, "Hands up" alert during exams, and any variety of other functions. Additionally, it should be understood that the present disclosure may be utilized not only in the education market, as discussed herein, but also in other markets, such as corporate, military, healthcare, and others.

As should also be understood, the present disclosure solves a number of problems, such as allowing non-users of the IHS to quickly determine a status of the IHSs in a group setting. For example, a teacher may obtain the status of a student's activities on the IHS 100. In a classroom setting teachers generally have a difficult time monitoring an entire classroom utilizing IHSs at the same time because the teacher is typically located at the front of the room facing any number of IHS display device backs. It may be difficult to move away from this teaching position to behind the students to monitor the students progress or status. The status display device 128 of the present disclosure allows for custom alerts that the teacher can quickly and easily see and address. Sometimes students fall behind in the modular electronic programs that are being utilized in today's schools. The present disclosure allows them to discretely indicate such incidences, which the teacher can quickly address and correct. In one to one deployments, the present disclosure offers a much more salient and full proof manner of delivering messages to parents or even students from the school. As such, parents can quickly learn if they need to attend to something school related, such as a permission slip, a report card, a school closing, a schedule changes, or any other item. In yet another setting, the present disclosure provides a quick and easy way for IT workers to identify problems within a set of notebook computers when the status display device 128 is configured to indicate such problem. For example, in a storage cart system, an IT worker can quickly look at the status display device 128 to assess IHS health, update status, virus/malware status, and any other status. The IT administrator can create these alerts based on their needs and integrate them into their current software set. Accordingly, the present disclosure provides a software tool to create, modify and deploy alerts to multiple IHSs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) comprising:
a plurality of student IHS's, each student IHS including:
a student IHS chassis;
a processor housed in the student IHS chassis;
a memory module communicatively coupled to the processor;
a display device that is housed in the student IHS chassis and that is viewable from a first side of the student IHS chassis that faces a first direction; and
a status alert display device that is located on a second side of the student IHS chassis that faces a second direction that is opposite the first direction such that the status alert display device is viewable by a teacher user that is located on the second side of the student IHS chassis, but not viewable by a student user that is located on the first side of the student IHS chassis and simultaneously viewing the display device;
wherein the memory module include instructions that, when executed by the processor, cause the processor to place the student IHS into one of a testing mode and a working mode, activate the status alert display device in the testing mode according to first activation details, and activate the status alert display device in the working mode in response to detecting the operation of at least one unauthorized application program and according to second activation details;
a teacher IHS communicatively coupled to each of the plurality of student IHS's over a network and including:
a student IHS control application that is configured to send instructions to set each of the plurality of student IHSs in either of the testing mode and the working mode;
wherein the student IHS control application is configured to receive testing mode details that restrict communication and file operations on each of the plurality of student IHSs and define the first activation details of the status alert display device on each of the plurality of student IHSs when in the testing mode; and
wherein the student IHS control application is configured to receive working mode details that define the at least one unauthorized application program and the second activation details of the status alert display device on each of the plurality of student IHSs when in the working mode.

2. The IHS of claim 1, wherein the status alert display device on each of the plurality of student IHSs is configured to change colors to provide different status indications to the teacher user.

3. The IHS of claim 1, wherein the status alert display device on each of the plurality of student IHSs is configured to sequentially illuminate off and on to provide different status indications to the teacher user.

4. The IHS of claim 1, wherein the status alert display device on each of the plurality of student IHSs includes a light emitting diode (LED) or a liquid crystal display (LCD).

5. The IHS of claim 1, wherein on each of the plurality of student IHSs include an application programming interface that is operable to receive the instructions from the teacher IHS that cause the student IHS to change operating modes between the testing mode and the working mode and, in response, indicate the change in operating modes using the status alert display device.

6. The IHS of claim 1, wherein the status alert display device on each of the plurality of student IHSs outputs different visual messages depending on a different operating mode of the student IHS.

7. The IHS of claim 1, wherein the unauthorized application program is a browser application, and wherein each of the plurality of student IHSs are operable to receive an instruction from the teacher IHS to turn off Internet access for the student IHS and, in response, prevent the student IHS from accessing the Internet.

8. A device status alert system comprising:
a plurality of first information handling systems (IHS), each of the plurality of first IHSs including:
a first IHS chassis;
a first IHS processor housed in the first IHS chassis;
a first IHS memory module communicatively coupled to the first IHS processor;
a first IHS display device that is housed in the first IHS chassis and that is viewable from a first side of the first IHS chassis that faces a first direction; and
a status alert display device that is located on a second side of the first IHS chassis that faces a second direction that is opposite the first direction such that the status alert display device is viewable by a first user that is located on the second side of the first IHS chassis, but not viewable by a second user that is located on the first side of the first IHS chassis and simultaneously viewing the first IHS display device;
wherein the first IHS memory module include instructions that, when executed by the first IHS processor, cause the first IHS processor to activate the status alert display device based on an operating mode of the first IHS; and
a second IHS communicatively coupled to each of the plurality of first IHSs, the second IHS including:
a second IHS processor;
a second IHS memory module communicatively coupled to the second IHS processor;
a second IHS user input device; and
second IHS interface software running on the second IHS, wherein the second IHS interface software is configured to send instructions to set each of the plurality of first IHSs in any of at least three operating modes that include a testing mode, a working mode, and an alert mode;

wherein the second IHS interface software is configured to receive testing mode details that restrict communication and file operations on each of the plurality of first IHSs and define first activation details of the status alert display device on each of the plurality of first IHSs when in the testing mode;

wherein the second IHS interface software is configured to receive working mode details that define at least one unauthorized application program and second activation details of the status alert display device on each of the plurality of first IHSs when in the working mode; and wherein the second IHS interface software is configured to receive alert mode details that include a communication and third activation details of the status alert display device on each of the plurality of first IHSs when in the alert mode, wherein the third activation details include activation of the status alert display device until an acknowledgement of the communication is received.

9. The system of claim 8, wherein the status alert display device on each of the plurality of first IHSs is configured to change colors and to sequentially illuminate off and on to provide different status indications to the first user.

10. The system of claim 8, wherein the status alert display device on each of the plurality of first IHSs includes a light emitting diode (LED) or a liquid crystal display (LCD).

11. The system of claim 8, wherein the memory module on each of the plurality of first IHSs include instructions that, when executed by the first IHS processor, cause the first IHS processor to place the first IHS into the working mode, and activate the status alert display device in the working mode in response to detecting the operation of the at least one unauthorized application program and according to the second activation details.

12. The system of claim 11, wherein the unauthorized application program is a browser application, and wherein each of the plurality of first IHSs are operable to receive an instruction from the second IHS to turn off Internet access and, in response, prevent access to the Internet.

13. The system of claim 8, wherein the first IHS memory module on each of the plurality of first IHSs include instructions that, when executed by the first IHS processor, cause the first IHS processor to place the first IHS into the testing mode, and activate the status alert display device in the testing mode according to first activation details.

14. The system of claim 8, wherein the first IHS memory module on each of the plurality of first IHSs include instructions that, when executed by the first IHS processor, cause the first IHS processor to place the first IHS into the alert mode, and activate the status alert display device until an acknowledgement of the communication is received.

15. A method comprising:
providing a plurality of student information handling systems (IHS), each student IHS including a student IHS chassis that houses a display device that is viewable on a first side of the student IHS chassis that faces a first direction, and a status alert display device that is located on a second side of the student IHS chassis that faces a second direction that is opposite the first direction such that the status alert display device is viewable by a teacher user that is located on the second side of the student IHS chassis, but not viewable by a student user that is located on the first side of the student IHS chassis and simultaneously viewing the display device;

setting, by a teacher IHS over a network, each of the plurality of student IHSs in a testing mode that restricts communication and file operations on each of the plurality of student IHSs and defines first activation details of the status alert display device on each of the plurality of student IHSs;

activating the status alert display device on each of the plurality of student IHSs according to the first activation details when in the testing mode;

setting, by the teacher IHS over the network, each of the plurality of student IHSs in a working mode that defines at least one unauthorized application program and second activation details of the status alert display device on each of the plurality of student IHSs;

monitoring application programs operating on each of the plurality of IHSs by a monitoring program; and detecting the operation of the at least one unauthorized application program on at least one of the plurality of student IHSs and, in response, activating the status alert display device by the monitoring program on the at least one of the plurality of student IHSs that is operating the unauthorized application program.

16. The method of claim 15, further comprising:
dynamically receiving instructions of the at least one of the plurality of student IHSs that is operating the unauthorized application program from the teacher IHS that cause the monitoring program to prevent Internet access by the at least one of the plurality of student IHSs.

17. The method of claim 15, further comprising:
changing colors of the status alert display device on each of the plurality of student IHSs to display different status indications of the student IHS.

18. The method of claim 15, further comprising:
setting, by the teacher IHS over the network, at least one of the plurality of student IHSs in an alert mode that includes a communication and third activation details of the status alert display device on each of the plurality of student IHSs, wherein the third activation details include activation of the status alert display device until an acknowledgement of the communication is received.

19. The method of claim 18, further comprising:
activating the status alert display device on the at least one of the plurality of student IHSs according to the third activation details when in the alert mode.

20. The method of claim 19, further comprising:
deactivating the status alert display device on the at least one of the plurality of student IHSs according to the third activation details when in the alert mode in response to receiving the acknowledgment of the communication.

* * * * *